United States Patent [19]
Ghisler

[11] 4,048,445
[45] Sept. 13, 1977

[54] METHOD FOR THROUGH CONNECTION CHECK IN DIGITAL DATA SYSTEM

[75] Inventor: Walter Ghisler, Upplands Vasby, Sweden

[73] Assignee: L.M. Ericsson Pty. Ltd., Australia

[21] Appl. No.: 603,501

[22] Filed: Aug. 11, 1975

[30] Foreign Application Priority Data

Aug. 9, 1974 Australia .............................. 8462/74

[51] Int. Cl.² .............................................. H04J 3/14
[52] U.S. Cl. .......................... 179/15 BF; 179/15 AT
[58] Field of Search ........ 179/15 BF, 15 AT, 15 AQ, 179/175.23, 175.2 R, 18 GF

[56] References Cited

U.S. PATENT DOCUMENTS

| | | | |
|---|---|---|---|
| 3,573,377 | 4/1971 | Anoerson | 179/2 TS |
| 3,760,115 | 9/1973 | Duerdoth | 179/18 GF |
| 3,851,122 | 11/1974 | Gibson | 179/175.23 |
| 3,891,805 | 6/1975 | Flanagan | 179/15 BF |

FOREIGN PATENT DOCUMENTS 4,327,263  6/1966  Japan ................................ 179/15 BF

*Primary Examiner*—David L. Stewart
*Attorney, Agent, or Firm*—Cushman, Darby & Cushman

[57] ABSTRACT

A digital data switch of the time-space-time (TST) type for switching pulse code modulated (PCM) data is disclosed. The switch combines a parity bit with each PCM word being switched in a conventional way to supervise the internal operation of the switch. The invention consists of a method of using such a switch for checking that a correct or intended connection is made through the switch by inserting incorrect parity with PCM words to the input in question immediately after the connection is established and checking the outlets of the switch to determine the output/s having incorrect parity. The check is made by the central control of the switch which compares the output/s having incorrect parity with the intended output/s. A simple circuit arrangement for distinguishing deliberately introduced wrong parity from through connection faults is also disclosed.

5 Claims, 1 Drawing Figure

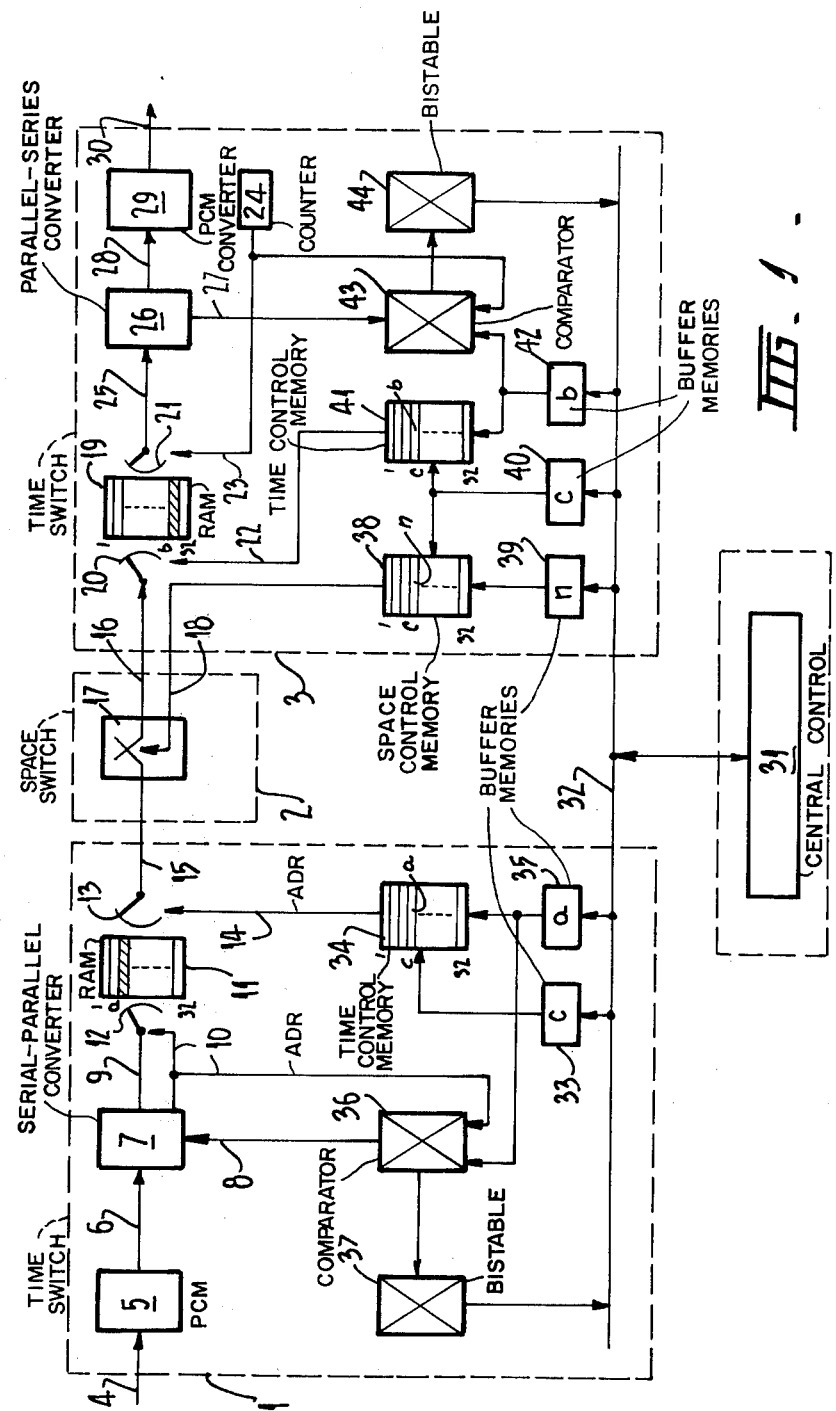

METHOD FOR THROUGH CONNECTION CHECK IN DIGITAL DATA SYSTEM

This invention relates to digital data systems and more particularly to a method for providing a through connection check in a digital data switching system, for example a digital telephone system.

The term "through connection" in the context of this specification generally means a connection from a certain input of a switch to a certain output of the switch with no other connections existing which include said input or output. Of course this definition, for the purpose of simplification, omits special connections which are relevant to conference calls or operator connections. The difference in these cases is that several outputs are to be connected to a certain input. However, the spirit and scope of the invention also comprises this kind of connection.

In analogue telephone systems it is known to provide a through connection check immediately after a connection has been established by sending a current through the switch and checking that it is received at the desired location. Obviously it is not possible to send a current through a digital system in the same manner although it may be possible to send a particular code through the switch on the establishment of a connection and check that this code or code word is received at the desired output. However, relatively complex additional circuitry would be involved in generating and detecting the particular code and advising the central control of the status of the connection which has been made. Furthermore, it would be necessary to separate, in time, the test procedure and data transmission in itself or to introduce a special code restriction meaning that a certain bit combination is reserved for the chosen code word and thus is prevented from appearance in the information carrying data flow.

The object of this invention is to provide a method for providing a through connection check in a digital data switch which avoids the use of complex extra circuitry.

The method according to the invention is characterized in that incorrect parity is deliberately introduced, under control, into the digital bitstream entering a switch input after all measures are taken in order to set up a connection between said input and a certain output of the switch, said output is checked for said incorrect parity and information is transmitted to a control unit concerning the result of said checking procedure to indicate the establishment of a faulty or correct connection.

Provided that data is provided with a parity bit at least during transmission through the switch to make possible error detection in the usual way, the extensiveness of the extra circuitry necessary for carrying out the method according to the invention is very small. If a method of utilizing deliberate introduction of incorrect parity is already in use in the switch in order to control the parity generator and parity detector respectively, then no extra circuitry is needed in the switch in order to make use of this invention.

According to the fact that the exploitation of the invention does not affect the data, the traffic can start before the test is completed, for example 1 ms earlier. This is of great importance in certain types of data traffic where fast through connection is especially desirable. furthermore it is possible to perform the check at any time during traffic transmission, which fact is very valuable for supervision and diagnosis. This is, however, not possible in the previous systems working without a code restriction. Compared with a system working with a special code word and without code restriction one achieves, with a control procedure according to the invention, a considerably greater scope by the detection of multiple connections, i.e. connections between the input the outputs other than the one desired. If the special code word appears at an unexpected output it is not possible at once to regard this as a multiple connection since without code restriction the special code word can appear among ordinary data.

In order that the invention may be more clearly understood one particular embodiment will now be described in detail below. The embodiment refers to a PCM-switch of the TST (Time-Space-Time) type i.e. a switch which has three switching stages of which the first and the last are so called time stages and the intermediate is a so called space stage. Such a switch is described in for instance the publication "Electrisches Nachrichtenwesen", Band 38, Nr.1, 1963.

In the drawing FIG. 1 shows a block diagram of a switch of said kind which works completely digital, but communicates with fully analogue surroundings.

In the FIGURE there is shown within dashed lines the fundamental units of the switch, the time switching stages 1 and 3 with the intermediate space switching stage 2 and the central control unit 31. For the sake of simplicity the transmission is considered in just one direction which in the FIGURE flows from left to right.

To the input side of the switch a number of telephone circuits are connected. These circuits are divided in the conventional way into a number of groups each comprising for instance thirty circuits. Below we are considering one of these groups namely group n which is connected by trunk circuits 4 to the time switching stage 1 of the switch. Thus the trunks are carrying analogue speech signals from the subscribers of this group. The output of the switch is, in a similar way connected to a number of telephone circuits and we are here considering group m which, by the trunks 30, is connected to the time switching stage 3 of the switch. Below we are thus pressing that the present information has determined that a circuit of the group n shall be connected to a circuit of the group m.

As interface units between the digital switch and the analogue surroundings two PCM-terminals 5 and 29 are used. At the input side the PCM-terminal 5 converts the analogue speech signals from the circuits associated to the group n to the corresponding digital PCM-signals. These signals are fed in serial form via the conductor 6 to a serial parallel converter and parity generator 7 together with a channel address associated with each circuit. At the conductor 6 each circuit thus occupies, by means of its speech sample, a definite one of the 32 time slots available in each PCM-frame.

A connection between two circuits consists of transferring one 8-bit speech sample plus parity bit from the input side to the output side in a definite time slot in a definite number of PCM-frames, each 125 μs, which number is determined by the duration of the connection. The parity bit added to each speech sample by the generator 7 enables a check to be made to ensure that the speech sample passes unchanged through the switching stages. The use of an internal parity bit in this way is well known in the art.

Besides the generation of a parity bit for each incoming speech sample, the generator 7 also converts data to parallel form. At two outputs 9 and 10 from the generator 7 the data plus parity bit and the associated channel address then appears respectively. The output 9 is connected to the input of a selector 12. The output of the selector is connected to a RAM-memory 11 comprising 32 memory areas each with a memory capacity of one speech sample plus parity bit. The writing in this memory is controlled by the channel address of said output 10 connected to the control input 12 of said selector.

A reading unit 13 is also connected to the memory 11. The reading unit 13 is controlled by a channel address at an output 14 from a time control memory 34 which can read the contents, i.e. one speech sample plus parity bit, from the addressed memory cell. The information achieved in this way is fed by a buss connection 15 (associated with group n) to the space cross point connecting field 17 of a space switching stage 2. In this cross point connecting field 17 any incoming buss can be connected to any outgoing buss under control of the information in a number of RAM-type space control memories such as memory 38, each associated with an outgoing buss. In the FIGURE the outgoing buss 16 (associated with group m) is shown together with the associated space control memory 38.

Quite contrary to the situation in the time switching stage 1 the buss 16 is connected to a writing unit 20 of a RAM-memory 19 of a similar kind as the memory 11. The writing unit 20 is controlled by a channel address at the output 22 from a time control memory 41 corresponding to the memory 34 in the time switching stage 1. The reading unit 21 for reading from the memory 19 is controlled by a counter 24 and feeds the achieved information, i.e. a speech sample plus parity bit, in parallel form to a connector 25. The information is then parallel-series converted in a converter 26 which also carries out a parity control of a speech sample. The speech sample is transmitted in serial form on the connector 28 to the PCM-terminal 29 which conversely to the terminal of the input side converts the digital information to analogue form.

For the realization of a connection between two subscribers for instance the subscriber with the circuit number $a$ in the group $n$ and the subscriber with the circuit number $b$ in the group $m$ is carried out briefly as follows:

Circuit $a$ is assigned, by the PCM-terminal 5, the time slot $a$ on the connection 6. The channel address $a$ is fed to the output 10 simultaneously as the speech sample from the subscriber $a$ is fed to the output 9 of the generator 7. The writing into the memory 11 thus is carried out in a memory cell $a$. If one now assumes that the central control unit 31, in the conventional way has found an idle time slot $c$ on buss 15 and buss 16 then the control unit 31 writes the identity number of the idle time slot in the space switching stage, into two buffer memories 33 and 35 via a control buss 32 which is common for the whole switch. The storing place in the memory 11 is also written into the two buffer memories 33 and 35 via control buss 32. The two identity numbers are then used by the writing in the time control memory 34, which like the memory 11 has 32 memory cells, in such a way that the information $a$ is stored in the memory cell No. $c$. The information in the time control memory 34, which points out the different memory cells in the memory 11, is cyclically accessible. In this way the reading to the buss 15 will thus take place in the time slot $c$ from the memory cell $a$ of the memory 11, which cell contains the speech sample plus parity bit of the circuit $a$.

In order to transfer this information to the buss 16 the busses 15 and 16 must be connected to each other in the cross point connecting field 17 of the space switching stage 2 during the time slot $c$. In order to have this procedure carried out the central control unit 31 writes, into two buffer memories 39 and 40 via the control buss 32, the identity numbers of the input buss 15 and the time slot $c$ in the space switching stage respectively. These two buffer memories are connected to the buss control memory 38 in the same way as the previously mentioned buffer memories 33 and 35 are connected to the time control memory 34. The identity numbers are then written into the memory 38 in the same way as before and the information $n$ is consequently stored in the memory cell $c$.

The information in the buss control memory 38 is cyclically accessible and addresses the input busses in the space crosspoint connecting field 17 one after the other. In this manner the buss 15 is connected to the buss 16 in the time slot $c$.

The memory 19 in the time switching stage 3 is a counterpart to the memory 11 in the time switching stage 1. The writing procedure is the same here as the reading procedure in the time switching stage 1. Information is written into the time control memory 41 via two buffer memories 40 and 42. In this manner information about the identity of the circuit $b$ is stored in the buffer memory 42. By cyclically reading the control information from the memory 41 in the time slot $c$, information for storing in the cell $b$ of the memory 19 will thus be read from the buss 16.

The reading from the memory 19 is carried out fully cyclically according to the above and therefore the time slot $b$ in every PCM-frame at the connector 28 after parallel-series conversion will be occupied a speech sample of the circuit during the duration of the connection.

In the parallel-series converter 26 the parity is also controlled for each speech sample according to the above. The result, i.e. odd or even parity, is indicated at the output 27 which information in the previously known system is fed to the central control unit. Should incorrect parity be present suitable measures, as for example, alarm could be taken.

In the time switching stage 1 according to the invention a comparator 36 is introduced having two signal inputs connected to the output 10 from the parity generator 7 and the output from the buffer memory 35, respectively. Thus when the address of the incoming channel equals the channel address in the buffer memory 35 an output signal appears at the output 8 from the comparator. This output is connected to an inverting input of the parity generator 7 at which the signal inverts the parity bit added to the actual speech sample, i.e. incorrect parity is introduced on purpose. A bistable register 37 which is connected to the comparator 36 detects simultaneously that inverted parity has been introduced. This register can be read from the central control unit by the control buss 32.

In a corresponding way a comparator 43 has been introduced in the time switching stage 2, the signal inputs of which are connected to the output from the counter 24 and the output from the buffer memory 42, respectively. When the channel address from the counter 24 equals the address which is stored in the memory 42 and simultaneously incorrect parity is indicated at the connector 27 from the parity control circuit 26 to the circuit 43, this latter provides an activating signal to one of the flip flops in a two bit register 44 which is connected to the circuit 43. In this manner incorrect parity has thus been detected in a channel which is just through connection supervised. The central control unit 31 reads the register via the control buss 32. If on the other hand incorrect parity is indicated on the connector 27 without a simultaneous accordance between the channel address in the buffer memory 42 and the channel address from the counter 24 there is a through fault in the system. This fault can for instance be a multiple connection of said kind. In this case the circuit 43 provides an activating signal to other flip flops in the register 44. The control unit 31 reads this register too via the control buss 32.

To sum up one has, by introducing the units 36, 37, 43 and 44 to a switch of a kind which is previously known, achieved conditions for a new method for through connection control in a digital switch. Possibly these units according to the above are already present in the switch and are used for supervision of the parity generator and the parity control circuit. By these circumstances the invention provides a new method for utilizing this circuitry.

As mentioned above the exemplified embodiment only shows an arrangement for through connection supervision in one of the transmission directions whereas in practice the method could be readily applied to supervise in both transmission directions. Furthermore, the embodiment only refers to through connection control between the different groups n and m, but the method is also useful by through connection control within the same groups. Also, it should be appreciated that the invention could be applied to switches other than the T-S-T type illustrated above and in fact the invention may be utilized to supervise connections through a system including a number of switches under common control.

What is claimed is:

1. A method of checking for the correct connection establishment between a desired input and a desired output of a digital data switch of the kind utilized for switching data having a parity bit, the method comprised in the steps of:
   a. introducing an incorrect parity bit in one or more particular input data words in a digital data bit stream at said desired input after said connection has been established, and
   b. checking the outputs of said switch by a common control of said switch for parity of the output data words corresponding to said particular input data words to obtain information indicating a correct connection establishment.

2. A method according to claim 1 wherein said switch is adapted to switch PCM data in a telephone network and is of a time-space-time type.

3. A method of checking the correct connection establishment between desired input and output points in a digital data system including one or more switches between said points, said switches being under common control and wherein said data is transmitted with a parity bit, the method comprising the steps of:
   a. introducing an incorrect parity bit in one or more particular input words in a digital data bit stream at said desired input point after said connection has been established, and
   b. checking the output points of said switch by said common control for parity of the data words corresponding to said particular input words in order to obtain information indicating the correct connection establishment.

4. In a digital data switch having a parity bit generator at its input and a parity bit detecting means at its output and control means for connecting one of a plurality of input lines to a desired one of a plurality of output lines, a method of detecting the establishment of a correct connection between said input and said desired output comprising the steps of:
   a. establishing a connection between said input and said desired output line,
   b. introducing at least one incorrect parity bit in a data word in a digital bit stream coupled to said input,
   c. detecting the output of said switch for parity of the output data word corresponding to said input data word, and
   d. determining from said detected parity of said data word whether a correct connection has been established.

5. In a digital data switch adapted for switching PCM data in a telephone network, said switch being of the time-space-time type and having a parity bit generator at its input and a parity bit detecting means at its output and control means for connecting one of a plurality of input lines to a desired one of a plurality of output lines, a method of detecting the establishment of a correct connection between said input and said output comprising the steps of:
   a. establishing a connection between said input and said output,
   b. introducing at least one incorrect parity bit in a data word in a digital bit stream coupled to said input,
   c. detecting the output of said switch for parity of the output data word corresponding to said input data word, and
   d. determining from said detecting parity of said data word whether a correct connection has been established.

* * * * *